United States Patent
Merchant et al.

(10) Patent No.: US 10,465,714 B2
(45) Date of Patent: Nov. 5, 2019

(54) SILENCER DUCT HAVING SILENCING ELEMENT AND COUPLERS

(71) Applicant: General Electric Company, Schenectady, NY (US)

(72) Inventors: Laxmikant Merchant, Bangalore (IN); Javeed Iqbaluddin Mohammed, Bangalore (IN); Valery Ivanovich Ponyavin, Greenville, SC (US); Dinesh Venugopal Setty, Bangalore (IN); Hua Zhang, Greer, SC (US)

(73) Assignee: General Electric Company, Schenectady, NY (US)

( * ) Notice: Subject to any disclaimer, the term of this patent is extended or adjusted under 35 U.S.C. 154(b) by 681 days.

(21) Appl. No.: 14/855,902

(22) Filed: Sep. 16, 2015

(65) Prior Publication Data

US 2017/0074289 A1 Mar. 16, 2017

(51) Int. Cl.
| | |
|---|---|
| *F04D 29/66* | (2006.01) |
| *F04D 29/54* | (2006.01) |
| *F04D 29/52* | (2006.01) |
| *F02C 7/045* | (2006.01) |

(52) U.S. Cl.
CPC ............ *F04D 29/664* (2013.01); *F02C 7/045* (2013.01); *F04D 29/522* (2013.01); *F04D 29/545* (2013.01); *F05D 2220/323* (2013.01); *F05D 2250/50* (2013.01); *F05D 2260/96* (2013.01); *F05D 2260/962* (2013.01)

(58) Field of Classification Search
CPC ........ F04D 29/44; F04D 29/441; F04D 29/66; F04D 29/661; F04D 29/663; F04D 29/664; F04D 29/665; F02C 7/04; F02C 7/045; F05D 2260/96; F01N 2470/14
USPC ......................................... 181/214, 224, 238
See application file for complete search history.

(56) References Cited

U.S. PATENT DOCUMENTS

| | | | | |
|---|---|---|---|---|
| 3,537,485 | A * | 11/1970 | March ....................... | F16L 9/18 138/111 |
| 5,394,786 | A | 3/1995 | Gettle et al. | |
| 5,423,576 | A * | 6/1995 | Hunter ..................... | F16L 23/14 285/288.1 |
| 6,537,490 | B2 * | 3/2003 | Han ......................... | F01D 25/30 181/224 |
| 6,640,926 | B2 * | 11/2003 | Weinstein ............... | E04F 17/04 181/224 |
| 8,087,491 | B2 * | 1/2012 | Merchant ................ | F01D 25/30 181/224 |
| 2008/0020176 | A1 * | 1/2008 | Ayle ........................ | F02C 7/045 428/118 |

* cited by examiner

*Primary Examiner* — Jason D Shanske
*Assistant Examiner* — Julian B Getachew
(74) *Attorney, Agent, or Firm* — Dale Davis; Hoffman Warnick LLC (57) ABSTRACT

A silencer duct that may be part of, for example, a turbomachine inlet and may include a duct body, and a silencer element extending axially through the duct body. A first portion of a coupler may extend axially from a first side of the duct body. A second portion of a coupler may extend axially from a second side of the duct body. At least one of the first portion of the coupler and the second portion of the coupler are configured to couple to at least one of an adjacent silencer duct and an inlet.

14 Claims, 6 Drawing Sheets

SILENCER DUCT HAVING SILENCING ELEMENT AND COUPLERS

BACKGROUND OF THE INVENTION

The disclosure relates generally to acoustic attenuation, and more particularly, to a silencer duct having a silencing duct body and a silencing element extending therethrough and couplers extending axially from the duct body.

Noise reduction systems are used on a large variety of industrial machines such as turbomachines to reduce the acoustic impact to surrounding areas. In gas turbine systems, for example, noise reduction systems may be employed in the turbomachine inlet duct, gas turbine enclosures and barrier walls. Traditionally, to attain the necessary acoustic reduction requirements, silencer panels and acoustically treated walls are used in the noisy areas. One mechanism to reduce acoustic impact is to treat walls with acoustic absorbing material. Another mechanism is to place silencer panels in areas where noise reduction is required, such as a working fluid flow path in an intake system duct.

With regard to ducts, each duct typically includes a frame having a number of silencer panels therein. Each panel typically includes an acoustic absorbing material such as mineral/glass wool positioned by a metal supporting member and surrounded by an enclosure including stainless steel perforated sheets on the sides thereof. The sheets are held together by stainless steel end caps. The stainless steel perforated sheets are typically welded to the supporting members that hold the acoustic absorbing material. The perforated stainless steel sheets hold the acoustic absorbing material intact with the supporting members and propagate the sound waves through the perforations into the acoustic absorbing material. The ducts are also typically made of carbon or a metal, such as steel or stainless steel. Use of steel for the ducts and silencer panel enclosures presents a number of challenges. For example, the enclosures are very heavy, and are also difficult and costly to manufacture due to the cost of the material and the need for welding to form the ducts and panels. In addition, the panels must be welded in place to the surrounding metal duct and must be custom fit for a particular sized duct, but frequently cannot be formed in custom shapes due to the cost and difficulty to manufacture. The frames created with the silencer panels are also typically very large in relative size, and in particular, length.

BRIEF DESCRIPTION OF THE INVENTION

A first aspect of the disclosure provides a silencer duct, comprising: a duct body, a silencer element extending axially through the duct body, a first portion of a coupler extending axially from a first side of the duct body, and a second portion of a coupler extending axially from a second side of the duct body, wherein at least one of the first portion of the coupler and the second portion of the coupler are configured to couple to at least one of an adjacent silencer duct and an inlet structure frame.

A second aspect of the disclosure provides a silencer duct assembly, comprising: a plurality of silencer ducts, each silencer duct including: a duct body, a silencer element extending axially through the duct body, a first portion of a coupler extending axially from a first side of the duct body, and a second portion of a coupler extending axially from a second side of the duct body, wherein at least one of the first portion of the coupler and the second portion of the coupler are configured to couple to at least one of an adjacent silencer duct and an inlet structure frame.

A third aspect of the disclosure provides a turbomachine inlet, comprising: an intake frame forming a working fluid flow, the intake frame operatively coupled to a compressor, and a plurality of silencer ducts positioned within the intake frame, each silencer duct including: a duct body, a silencer element extending axially through the duct body a first portion of a coupler extending axially from a first side of the duct body, and a second portion of a coupler extending axially from a second side of the duct body, wherein at least one of the first portion of the coupler and the second portion of the coupler are configured to couple to at least one of an adjacent silencer duct and the intake frame.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides a silencer duct, a silencer duct assembly, and a turbomachine inlet including the silencer duct assembly.

Figure 1:
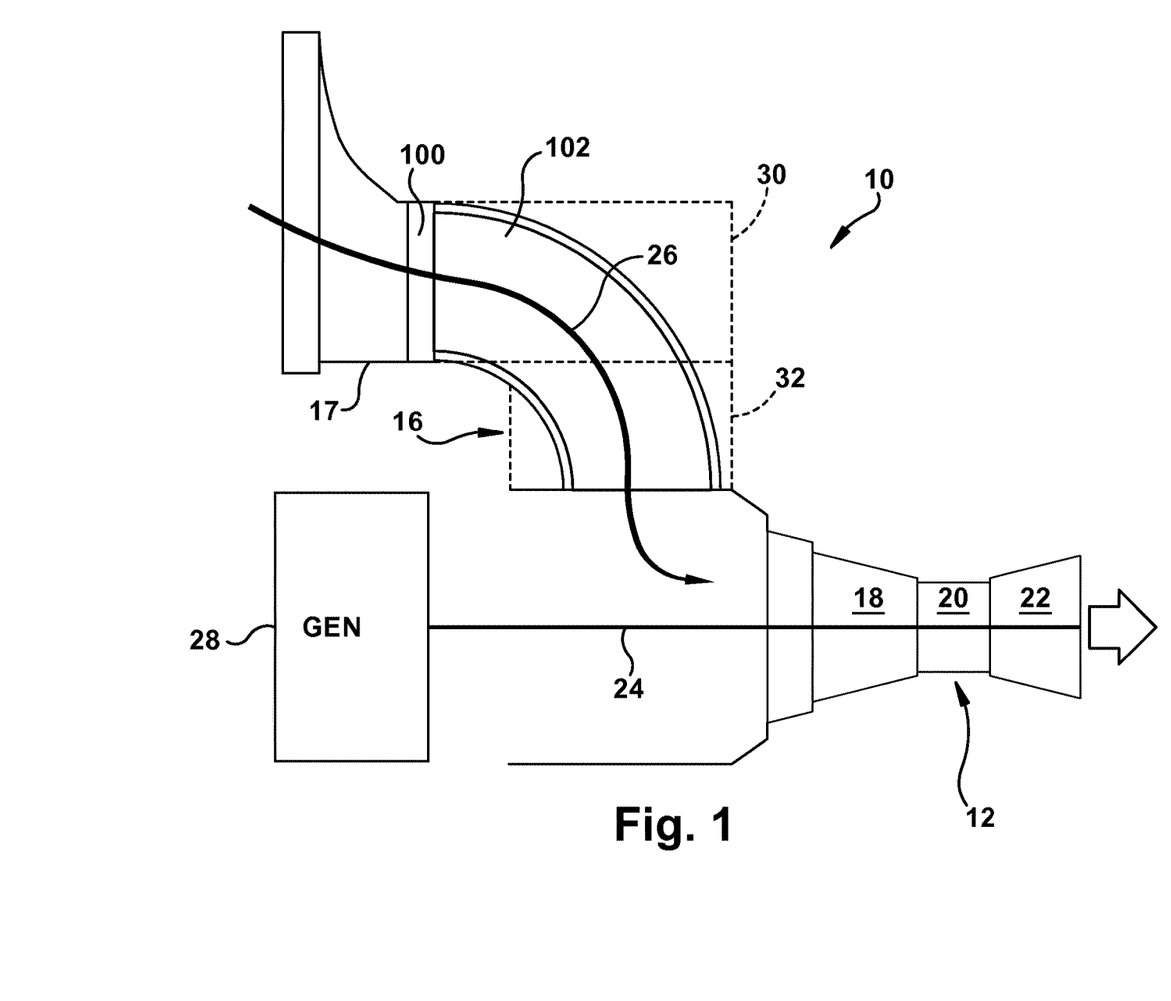
FIG. 1 shows a schematic view of an illustrative industrial machine employing a silencer duct according to embodiments of the disclosure.

Referring to the drawings, FIG. 1 depicts an illustrative industrial machine in the form of a turbomachine 10 (e.g., simple cycle gas turbine power generation systems) that may include, among other things, a gas turbine system 12. Gas turbine system 12 may combust liquid or gas fuel, such as natural gas and/or a hydrogen-rich synthetic gas, to generate hot combustion gases to drive gas turbine system 12. Gas turbine system 12 includes an air intake section 16, a compressor 18, a combustor component 20, and a turbine component 22. Turbine component 22 is drivingly coupled to compressor 18 via a shaft 24. In operation, air (e.g., ambient air) enters gas turbine system 12 through a turbomachine inlet or air intake section 16 (indicated by arrow 26) and is pressurized in compressor component 18. Inlet 16 may include an intake frame 17 for forming a working fluid flow therein. As illustrated, intake frame 17 is operatively coupled to compressor 18, which includes at least one stage including a plurality of compressor blades coupled to shaft 24. Rotation of shaft 24 causes a corresponding rotation of the compressor blades, thereby drawing air into compressor 18 via inlet 16 and compressing the air prior to entry into combustor component 20.

Combustor component 20 may include one or more combustors. In embodiments, a plurality of combustors are disposed in combustor component 20 at multiple circumferential positions in a generally circular or annular configuration about shaft 24. As compressed air exits compressor component 18 and enters combustor component 20, the compressed air is mixed with fuel for combustion within the combustor(s). For example, the combustor(s) may include one or more fuel nozzles that are configured to inject a fuel-air mixture into the combustor(s) in a suitable ratio for combustion, emissions control, fuel consumption, power output, and so forth. Combustion of the fuel-air mixture generates hot pressurized exhaust gases, which may then be utilized to drive one or more turbine stages (each having a plurality of turbine blades) within the turbine component 22.

In operation, the combustion gases flowing into and through turbine component 22 flow against and between the turbine blades, thereby driving the turbine blades and, thus, shaft 24 into rotation. In turbine component 22, the energy of the combustion gases is converted into work, some of which is used to drive compressor component 18 through rotating shaft 24, with the remainder available for useful work to drive a load such as, but not limited to, an electrical generator 28 for producing electricity, and/or another turbine. It is emphasized that turbomachine 10 is simply illustrative of one application in which a silencer panel and system according to embodiments of the invention may be employed. As air flows through inlet 16, noise is created such that a silencer system 100 in which a silencer duct 102 according to embodiments of the invention is employed to reduce the noise.

Referring to FIG. 1, in previous attempts, frequently a horizontal silencer 30 and elbow silencer 32, both illustrated in FIG. 1 in dashed lines, would have been required. In current embodiments, silencer duct 102, as illustrated in bold lines, can be of a curved shape, reducing the profile of the duct while also increasing the aerodynamics of silencer duct 102. As will be described, each silencer duct 102 (and 202, 302 in FIGS. 2 and 3) has a length that is typically shorter than conventional silencer frames and/or panels.

Figure 2:
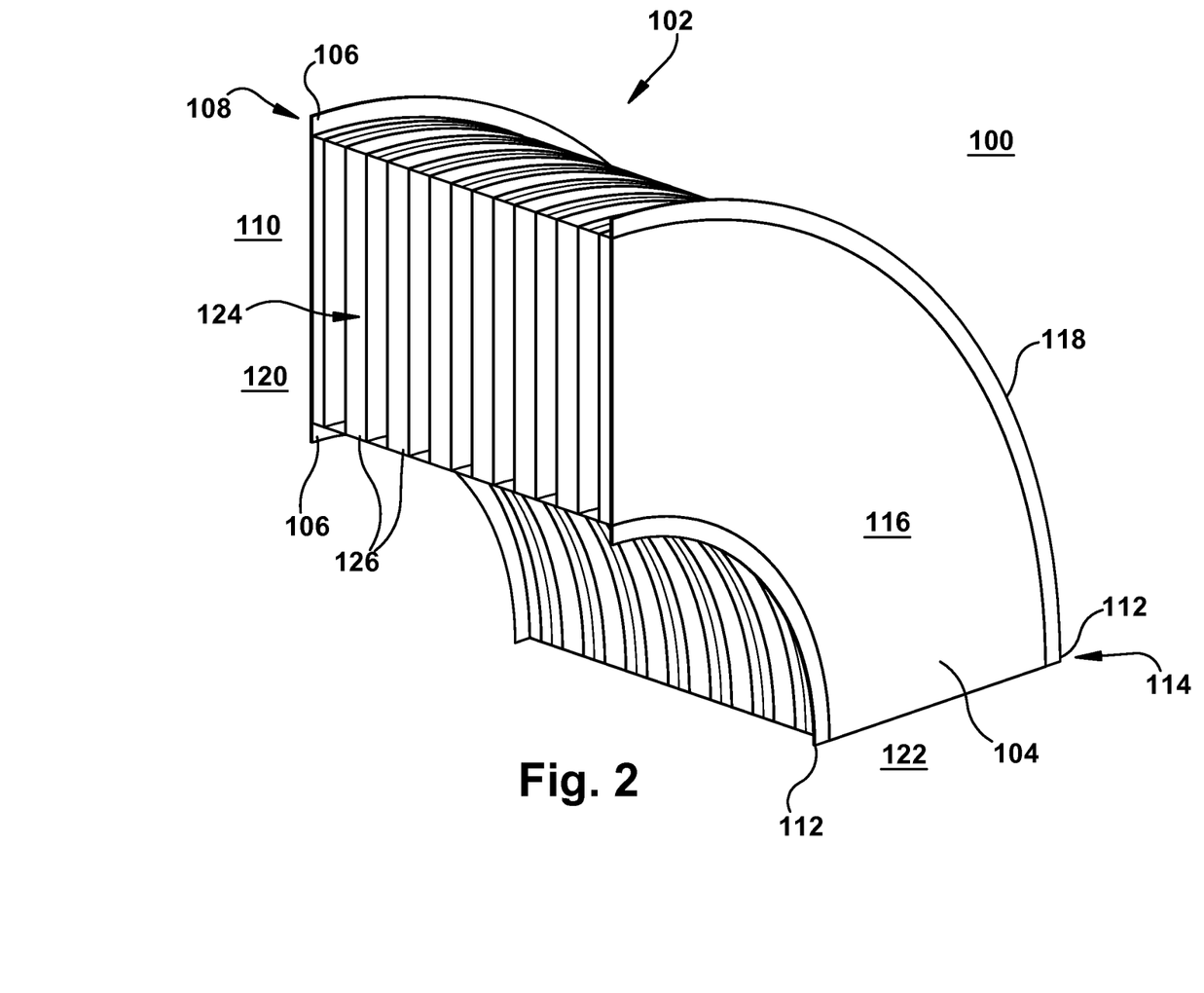
FIG. 2 shows a perspective view of a silencer duct according to embodiments of the disclosure.
Figure 3:
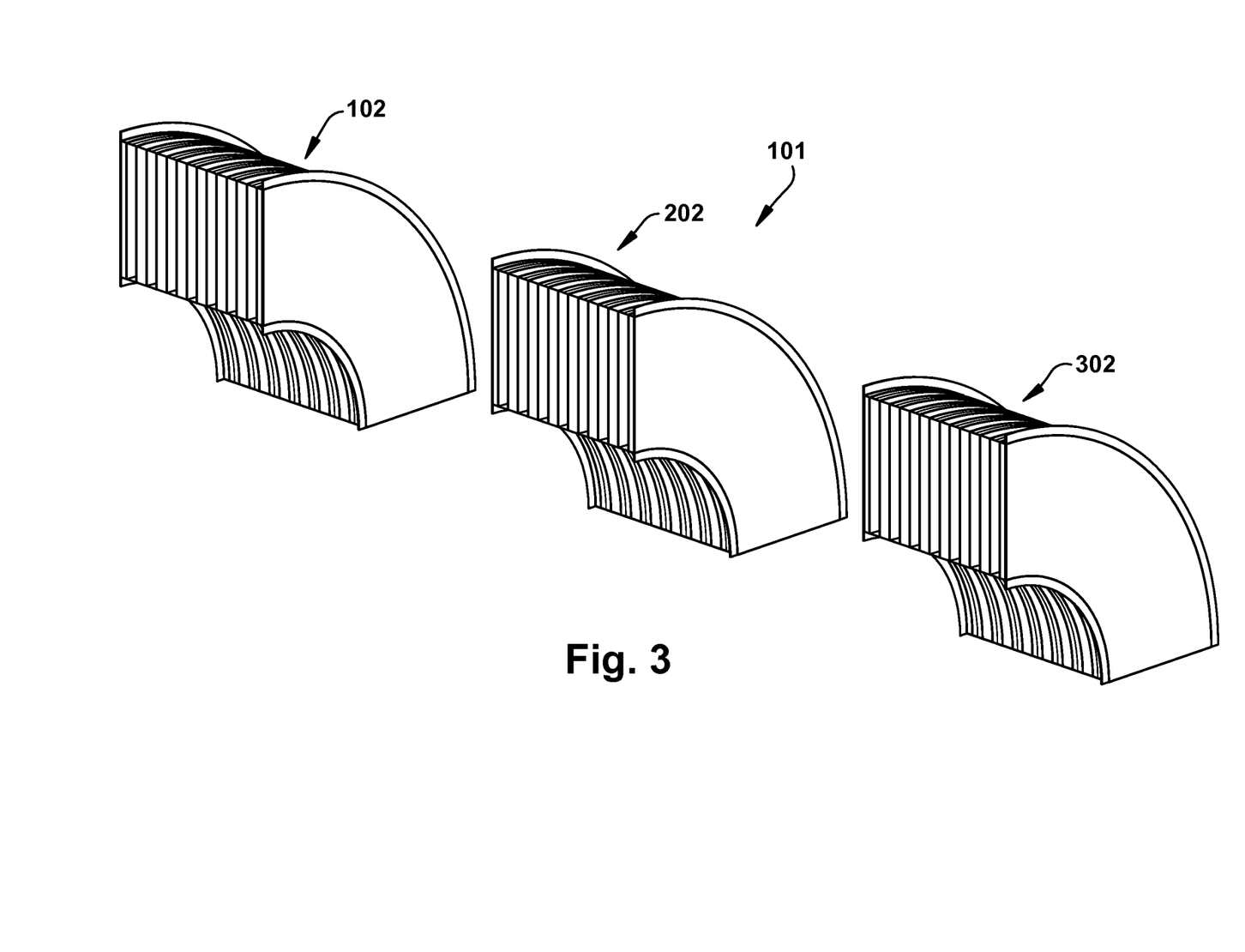
FIG. 3 shows a perspective view of a silencer duct assembly according to embodiments of the disclosure.

Referring to FIGS. 2-3, embodiments of a silencer duct 102, 202, 302 according to the disclosure are illustrated. Silencer duct 102, 202, 302 may include a duct body 104 and a silencer element 124 may extend axially through duct body 104. In embodiments, a first portion 106 of a coupler 108 may extend axially from a first side 110 of duct body 104, and a second portion 112 of a coupler 114 may extend axially from a second side 116 of duct body 104.

As illustrated in the example in FIGS. 2-3, duct body 104 has a substantially rectangular cross-section, however any cross-section, including substantially square or polygonal cross-sections are possible. As used herein, "substantially" indicates having the stated characteristic for the most part, but perhaps with some small variances, e.g., for structural interconnection to other parts, accommodating adjacent structure, ease of manufacture, etc. Other polygonal cross-sections may also be employed such as but not limited to: triangular, pentagonal, octagonal, etc. Many parts of silencer duct 102, 202, 302 may be made of a plastic, for example, polyvinyl chloride (PVC), polypropylene (PP), polypropylene co-polymer (PPC), polypropylene homo-polymer (PPH), polyethylene (PE), high density polyethylene (HDPE) or any other plastic capable of withstanding the environmental and operational characteristics of the particular frame and/or industrial machine in which the duct is employed. Silencer duct body 104 may be formed by any now known or later developed fashion such as: injection molding, extrusion, or coupling of a number of parts, e.g., using fasteners, welding, etc.

As shown in FIGS. 2 and 3, in some embodiments, silencer duct 102, 202, 302 may include a first portion 106 of a coupler 108 extending axially from a first side 110 of duct body 104. As shown in FIGS. 2 and 3, first portion 106 of coupler 108 may extend axially from a "top" and a "bottom" of first side 110. Similarly, silencer duct 102 may include a second portion 112 of a coupler 114 extending axially from a second side 116 of duct body 104. One or both of first portion 106 of coupler 108 and second portion 112 of coupler 114 can be configured to couple to, e.g., at least one of an adjacent silencer duct 102, 202, 302 (as seen in FIG. 3), and an inlet structure frame, e.g., intake frame 17 (FIG. 1). First portion 106 and second portion 112 of coupler (108 and 114) may be made of any material, but in one embodiment may include plastic as described above in reference to duct body 104. Configuring first portion 106 and second portion 112 of coupler (108 and 114) may include the use of flanges, which in some embodiments can be bolted together, the use of "dovetail" shapes or other interconnecting shapes, and the use of interlocking designs which may, for instance, be pressed together to form a lock. First portion 106 and second portion 112 of coupler (108 and 114) may be formed integrally with duct body 104, e.g., by injection molding, or may be mounted therein as a separate element As shown in FIGS. 2 and 3, in one embodiment, silencer duct 102, 202, 302 may include a first, axially curved portion 118 curving from an upstream end 120 to a downstream end 122 thereof such that all of a working fluid flow passing therethough impinges at least a portion of an interior surface thereof. That is, a working fluid, e.g., air, flowing therethrough has no clear line of sight from end 120 to 122 and is therefore incapable of taking a linear path through silencer duct 102, 202, 302. In this fashion, all of a working fluid is exposed to silencer element 124. In the embodiments shown, axially curved portion 118 has been illustrated as an approximate quarter circle curve, replacing horizontal and elbow (FIGS. 1; 30 and 32) silencer ducts of previous attempts; other shapes for increasing the aerodynamic flow are also possible and considered within the scope of the disclosure.

Figure 4:
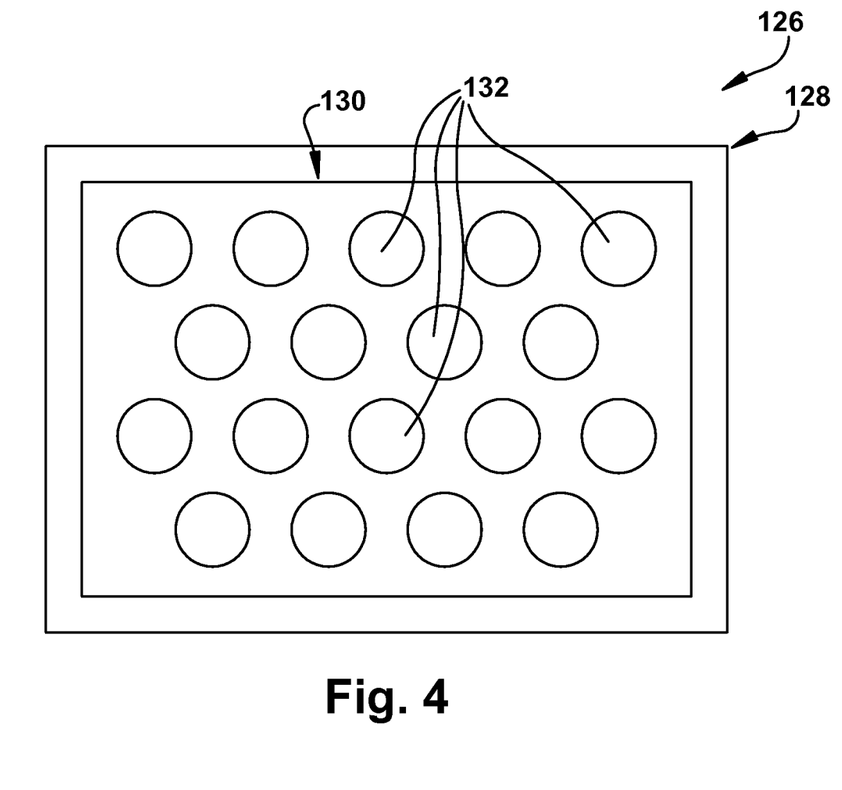
FIG. 4 shows a perspective view of silencer panel according to some embodiments of the disclosure.

Referring to FIGS. 2-3 collectively, silencer element 124 may include a plurality of silencer panels 126. Silencer panels 126 may include any now known or later developed noise reduction material or device to lower the sound emitted from silencer duct 102, 202, 302 utilizing silencer element 124. For instance, as illustrated in FIG. 4, silencer element 124 may include silencer panels 126, which can comprise an enclosure 128 including sidewalls 130 comprising a plurality of perforations 132. The sidewalls 130 with perforations 132 may be made of the same plastic described above in reference to duct body 104. In another embodiment, at least one baffle may include an acoustic absorbing material within the enclosure, for instance the acoustic absorbing material may include at least one of, but is not limited to, a foam, mineral wool, rock wool, and fiberglass.

Silencer element 124 can also be formed in a number of other shapes and/or with different segments. In some embodiments, silencer element 124, i.e., silencer panels 126 and any or all elements thereof, may be formed integrally with duct body 104, e.g., by injection molding, or may be mounted therein as a separate element.

In another embodiment, as illustrated in FIG. 3, silencer system 100 may include a silencer duct assembly 101, silencer duct assembly comprising a plurality of silencer ducts 102, 202, 302. Although illustrated as 3 silencer ducts, it should be understood that any number of ducts and arrangement of ducts may be possible. Additionally, silencer ducts 102, 202, 302 would be coupled using first and second coupler portions (106 and 108) rather than spaced out, as illustrated to show features of each duct. For instance, in order to fit a pre-existing intake frame 17 (FIG. 1) of an existing system, a plurality of silencer ducts 102, 202, 302 may be designed that are intended to be interconnected using first portion 106 and second portion of a coupler (106, 108) of each silencer duct 102, 202, 302 in order to fit a predetermined shape. In such an embodiment, the cost of production may be greatly reduced as silencer ducts 102, 202, 302 become modular units that are less expensive to produce and may be easier to form complex shapes or aerodynamic shapes that will benefit the system's overall performance, as well as reduce the noise generated. In these embodiments, each silencer duct 102, 202, 302 may include any or all features described above in reference to a single silencer duct. Additionally, each silencer duct 102, 202, 302 of the plurality may include identical duct bodies 104, or different shaped or sized duct bodies 104 from the rest of the plurality. In such a modular embodiment, each silencer duct 102, 202, 302 may include different silencer elements 130 or the same silencer elements 130, and complex systems can be designed using a plurality of modules.

Figure 5:
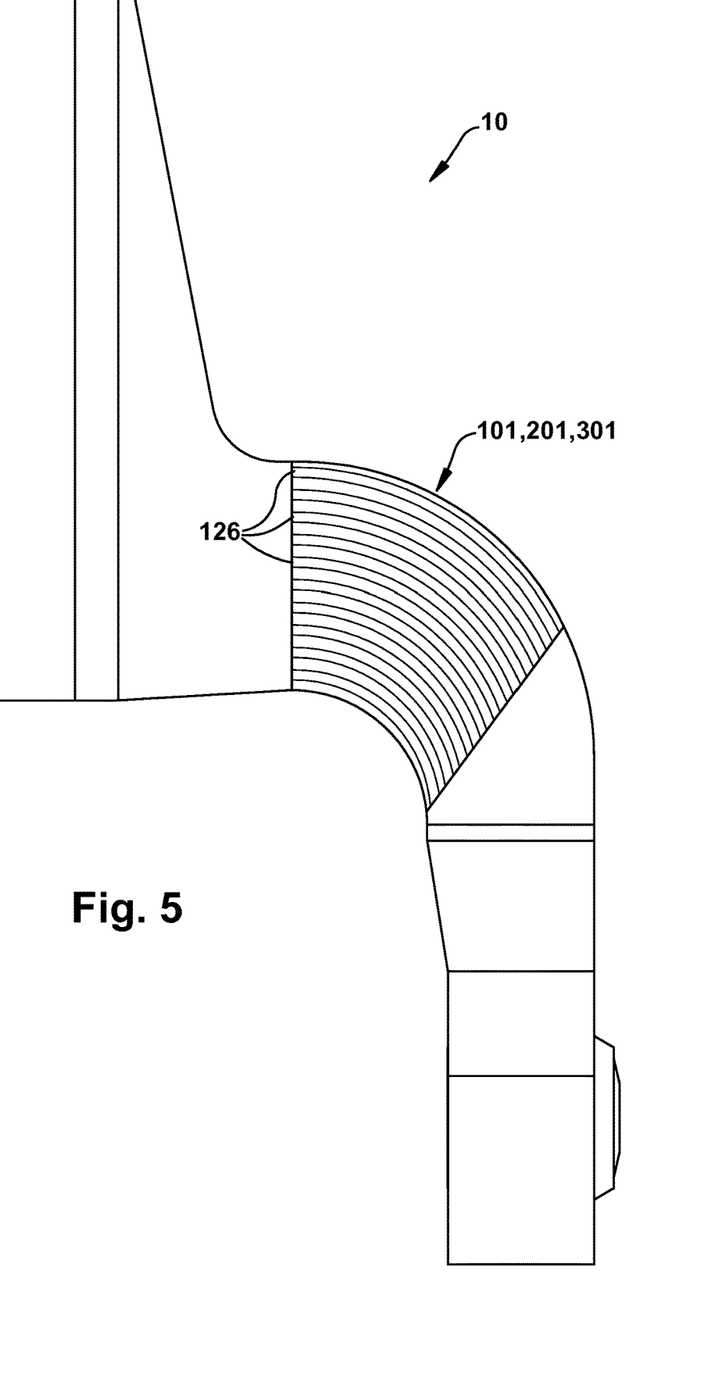
FIG. 5 shows a perspective view of a silencer duct assembly according to some embodiments of the disclosure.

In an alternative embodiment, as illustrated in FIG. 5, silencer duct 102, 202, 302 may comprise silencer panels 126 that are normal to the plane of the page, as illustrated. In such embodiments, silencer ducts 102, 202, 302 may be produced in a shape that can be joined together, utilizing any coupling elements disclosed above, but joined normal to the plane of the page of FIG. 5, essentially in a more horizontal direction compared to the vertical joining of other embodiments.

Figure 6:
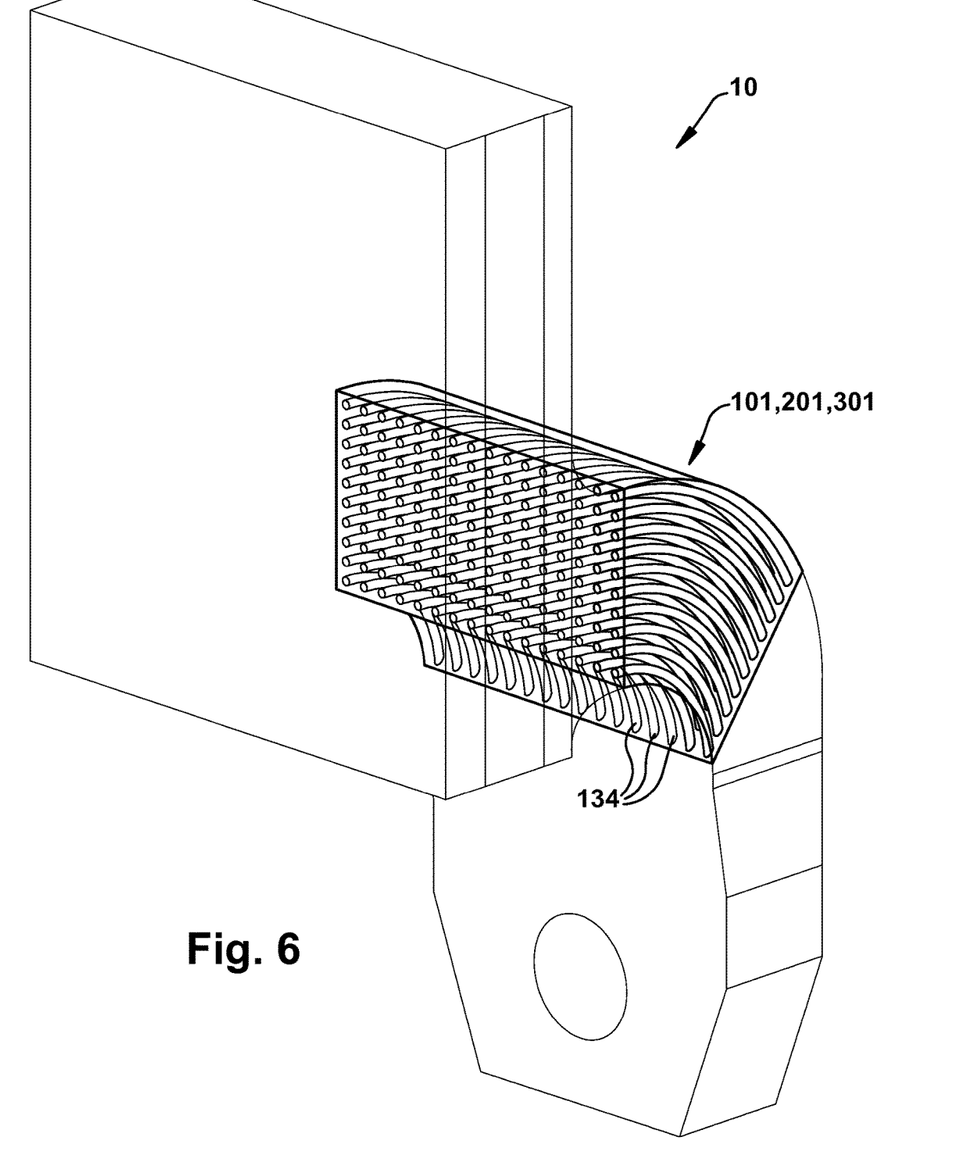
FIG. 6 shows a perspective view of a silencer duct assembly according to some embodiments of the disclosure.

In yet another embodiment, as illustrated in FIG. 6, silencer ducts 102, 202, 302 may be joined as in previous embodiments, but rather than silencer panels 126, silencer element 124 may comprise a plurality of tubes 134 extending through duct body 104. In these embodiments, tubes 134 provide the air flow path through duct body 104. Tubes 134 may be bent in any shape to match a curve or shape of duct body 104. Tubes 104 may include a perforated surface, similar to silencer panels 126 as illustrated in FIG. 4, but on the surface of the cylindrical tubes. Perforations allow for noise from airflow travelling through the tubes to be directed out of tubes 134. In some embodiments, the space around tubes 134 may be at least partially filled with acoustic absorbing material, as disclosed above, to absorb noise redirected from tubes 134.

Silencer duct 102, 202, 302, according to embodiments, provides a number of advantages over conventional frame with silencer panel configurations. For example, the irregular and streamlined flow paths created by the curved shape of duct body 104 increases the aerodynamics of silencer duct 102, 202, 302, and provides greater impact on the noise absorption, e.g., in a gas turbine during travel from compressor to outside, due to the shape of duct body 104 and the flow created for the acoustical waves. As a result, silencer ducts according to embodiments of the disclosure can be provided in a shorter length compared to conventional systems, and the cost of previous larger systems is reduced. Further, due to their plastic materials, the silencer ducts have reduced weight and are easier to handle, have reduced cost, and are easier to fabricate using, e.g., injection molding techniques for at least part of the ducts. The ducts also eliminate extensive welding within conventional support panels and between support panels and supporting members. In addition, the plastic used and the blocking of a direct line of sight provided by silencer duct 102, 202, 302, and in some embodiments, the curved shape of silencer duct 102, 202, 302, may provide slightly enhanced acoustic performance (e.g., a higher decibel (dB) attenuation of approximately, for example, 2 dB overall attenuation). In addition, plastic may allow increased perforation areal opening percentages compared to steel panels for perforated walls. Lastly, the ability to custom shape the silencer duct allows for more cost effective and aerodynamic design of a variety of shapes to fit inlet valves of nearly any type of device, as well easing the burden of removing the old duct and inserting the new duct in a replacement scenario, which typically requires a complex and difficult removal of a rotor and large spans of space moved while supporting the rest of the device. The aerodynamic design advantages can include a low pressure drop of the inlet system due to the shapes and materials disclosed above of silencer duct 102, 202, 302.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:
1. A silencer duct, comprising:
   a duct body including:
      an upstream end;
      a downstream end positioned opposite the upstream end;
      a first side extending between the upstream end and the downstream end; and
      a second side extending between the upstream end and the downstream end, opposite the first side,
      wherein the duct body is axially curved between the upstream end and the downstream end;
   a plurality of tubes extending axially through the duct body, each of the plurality of tubes including:
      a first end positioned adjacent to and in direct fluid communication with the upstream end of the duct body; and a second end positioned adjacent to and in direct fluid communication with the downstream end of the duct body;
acoustic absorbing material positioned within the duct body, adjacent and surrounding each of the plurality of tubes, the acoustic absorbing material at least partially filling the duct body;
a first coupler extending axially from the first side of the duct body, the first coupler extending from the upstream end of the duct body to the downstream end of the duct body; and
a second coupler extending axially from the second side of the duct body, the second coupler extending from the upstream end of the duct body to the downstream end of the duct body,
wherein at least one of the first coupler and the second coupler are configured to couple to at least one of an adjacent silencer duct and an inlet structure frame.

2. The silencer duct of claim 1, wherein at least one of the duct body, the first coupler, the second coupler, or the plurality of tubes are made of plastic.

3. The silencer duct of claim 1, wherein the acoustic absorbing material includes at least one of: a foam, mineral wool, rock wool, and fiberglass.

4. The silencer duct of claim 1, wherein each of the plurality of tubes further includes a plurality of perforations to allow noise to be provided to and absorbed by the acoustic absorbing material positioned within the duct body.

5. A silencer duct assembly, comprising:
a first silencer duct including:
a first duct body including:
an upstream end;
a downstream end positioned opposite the upstream end;
a first side extending between the upstream end and the downstream end; and
a second side extending between the upstream end and the downstream end, opposite the first side,
wherein the first duct body is axially curved between the upstream end and the downstream end;
a silencer element extending axially through the first duct body;
a first coupler of the first silencer duct extending axially from and parallel to the first side of the first duct body, the first coupler of the first silencer duct extending from the upstream end of the first duct body to the downstream end of the first duct body; and
a second coupler of the first silencer duct extending axially from and parallel to the second side of the first duct body, the second coupler of the first silencer duct extending from the upstream end of the first duct body to the downstream end of the first duct body; and
a second silencer duct coupled to the first silencer duct, the second silencer duct including:
a second duct body including:
an upstream end;
a downstream end positioned opposite the upstream end;
a first side extending between the upstream end and the downstream end, the first side of the second duct body positioned adjacent and directly contacting the second side of the first duct body of the first silencer duct; and
a second side extending between the upstream end and the downstream end, opposite the first side,
wherein the second duct body is axially curved between the upstream end and the downstream end;
a silencer element extending axially through the second duct body;
a first coupler of the second silencer duct extending axially from and parallel to the first side of the second duct body, the first coupler of the second silencer duct extending from the upstream end of the second duct body to the downstream end of the second duct body; and
a second coupler of the second silencer duct extending axially from and parallel to the second side of the second duct body, the second coupler of the second silencer duct extending from the upstream end of the second duct body to the downstream end of the second duct body,
wherein the first coupler of the second silencer duct directly contacts and is coupled to the second coupler of the first silencer duct.

6. The silencer duct assembly of claim 5, wherein at least one of the duct body, the first coupler, the second coupler, or the silencer element of the first silencer duct and the second silencer duct is made of plastic.

7. The silencer duct assembly of claim 6, wherein the silencer element of at least one of the first silencer duct or the second silencer duct comprises a plurality of silencer panels, and each of the plurality of silencer panels further includes at least one of a sidewall comprising a plurality of perforations and an acoustic absorbing material.

8. The silencer duct assembly of claim 7, wherein the sidewall comprising the plurality of perforations is made of plastic.

9. The silencer duct assembly of claim 7, wherein the acoustic absorbing material includes at least one of: a foam, mineral wool, rock wool, and fiberglass.

10. The silencer duct assembly of claim 5, wherein each of the first duct body and the second duct body include an approximately quarter circle axially curved portion curving from the upstream end to the downstream end thereof such that all of a working fluid flow passing through the first duct body and the second duct body impinges at least a portion of an interior surface of the first duct body and the second duct body.

11. A turbomachine inlet, comprising:
an intake frame forming a working fluid flow, the intake frame operatively coupled to a compressor; and
a plurality of silencer ducts positioned within the intake frame, each of the plurality of silencer ducts including:
a duct body including:
an upstream end;
a downstream end positioned opposite the upstream end;
a first side extending between the upstream end and the downstream end; and
a second side extending between the upstream end and the downstream end, opposite the first side,
wherein the duct body is axially curved between the upstream end and the downstream end;
a plurality of tubes extending axially from the upstream end of the duct body to the downstream end of the duct body, each of the plurality of tubes axially curved to match the axially curved duct body and including:
a first end positioned adjacent to and in direct fluid communication with the upstream end of the duct body; and a second end positioned adjacent to and in direct fluid communication with the downstream end of the duct body;

acoustic absorbing material positioned within the duct body, adjacent the plurality of tubes, the acoustic absorbing material at least partially filling the duct body;

a first coupler extending axially from the first side of the duct body; and a second coupler extending axially from the second side of the duct body, wherein at least one of the first coupler and the second coupler are configured to couple to at least one of an adjacent silencer duct of the plurality of silencer ducts and the intake frame.

12. The turbomachine inlet of claim 11, wherein at least one of the duct body, the first coupler, the second coupler, or the plurality of tubes of each of the plurality of silencer ducts are made of plastic.

13. The turbomachine inlet of claim 11, wherein the acoustic absorbing material includes at least one of: a foam, mineral wool, rock wool, and fiberglass.

14. The turbomachine inlet of claim 11, wherein each of the plurality of tubes in each of the plurality of silencer ducts further includes a plurality of perforations to allow noise to be provided to and absorbed by the acoustic absorbing material positioned within the duct body.

* * * * *